Figure 1:
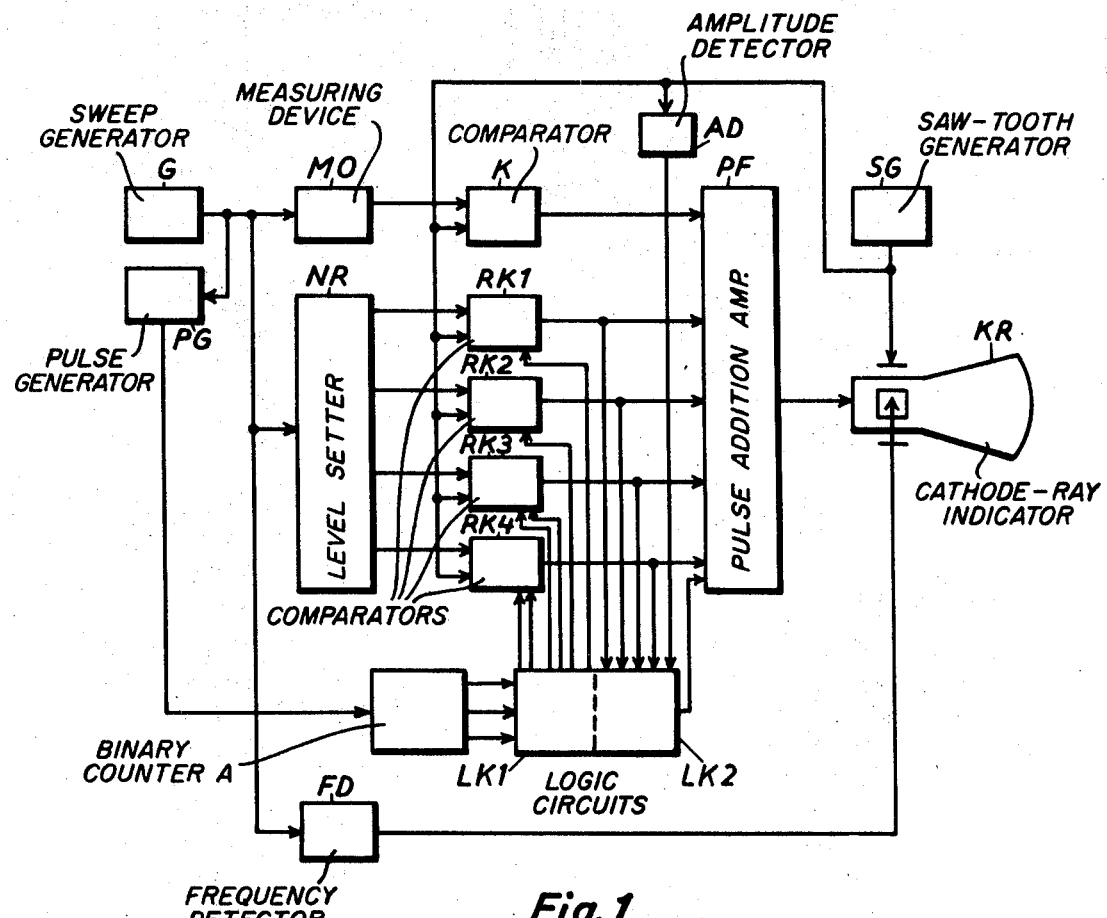

United States Patent

[11] 3,582,773

[72] Inventor Heniz Georg Karl Ronninge, Sweden
[21] Appl. No. 771,726
[22] Filed Oct. 30, 1968
[45] Patented June 1, 1971
[73] Assignee Telefonaktiebolaget L M Ericsson Stockholm, Sweden
[32] Priority Nov. 17, 1967
[33] Sweden
[31] 15803/67

[54] CIRCUIT ARRANGEMENT FOR REPRODUCING A TOLERANCE RANGE ON A CATHODE-RAY INDICATOR
4 Claims, 5 Drawing Figs.

[52] U.S. Cl. .................................................. 324/57, 324/88
[51] Int. Cl. ............................................. G01n 27/00
[50] Field of Search ............................................. 324/570, 57 N BC, 88, 121

[56] References Cited
UNITED STATES PATENTS
2,285,038  6/1942  Loughlin ..................... 324/57

*Primary Examiner*—Edward E. Kubasiewicz
*Attorney*—Hane and Baxley

ABSTRACT: A circuit arrangement provides for the generation of horizontal and vertical line segments related to voltage levels and frequencies, respectively, on a cathode-ray indicator to indicate the tolerance range of the transfer characteristic of a frequency sensitive measuring device. The device receives a sweep frequency signal from a sweep frequency generator. The sweep frequency generator in conjunction with a sawtooth generator is used by circuitry which performs level comparisons at particular frequencies on the output signal of the measuring device to provide intensity modulating pulses that are fed to the cathode-ray indicator.

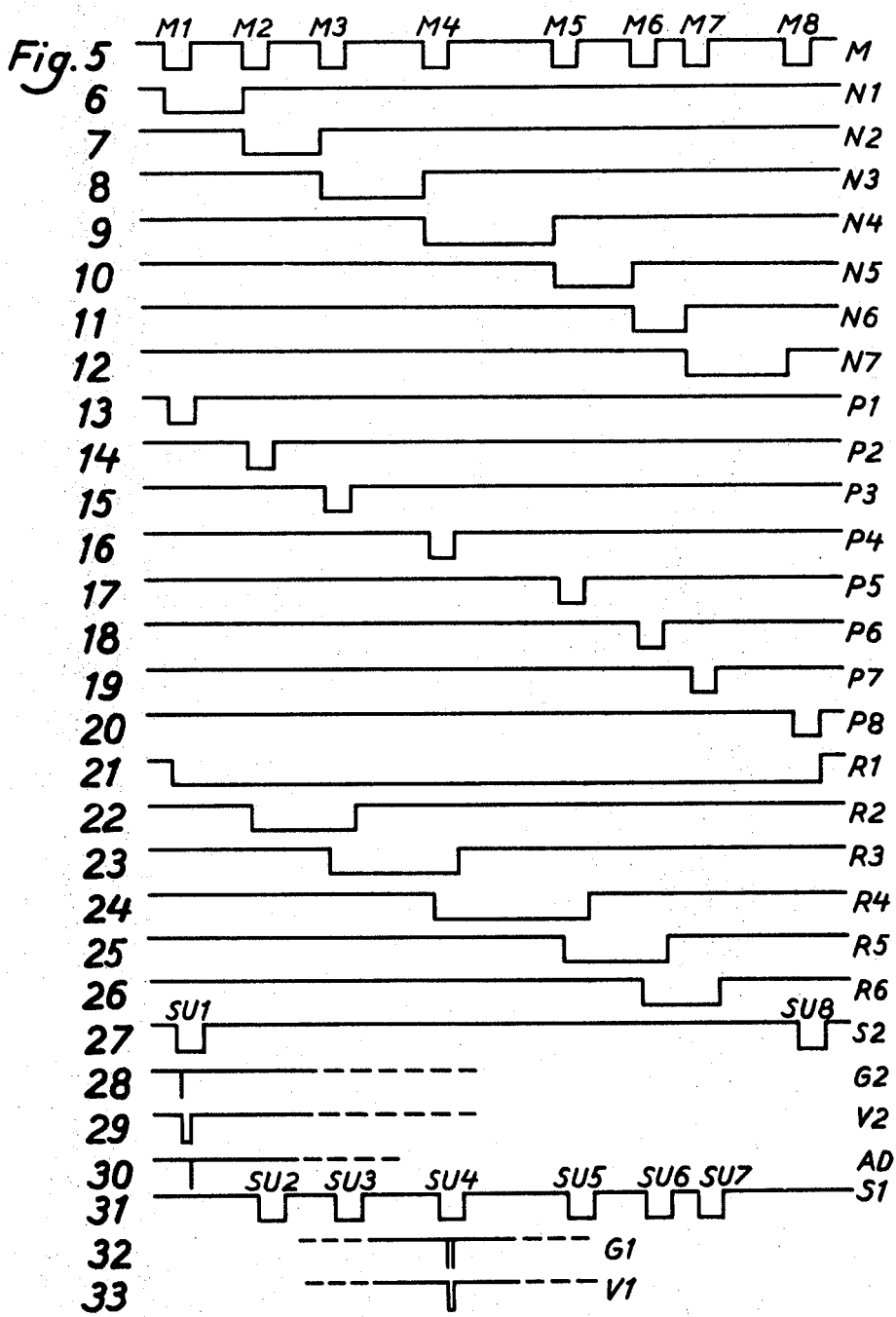

CIRCUIT ARRANGEMENT FOR REPRODUCING A TOLERANCE RANGE ON A CATHODE-RAY INDICATOR

The present invention relates to a circuit arrangement for reproducing a tolerance range on a cathode-ray indicator which measures the transmission characteristic of a frequency dependent measuring object.

Previously known cathode-ray indicators for monitoring the transmission characteristic of a frequency dependent measuring device usually comprise a sweep generator for supplying, via the measuring device, a signal to a comparator which compares the level of the output voltage of the measuring device with a signal obtained from a sawtooth generator. For each coincidence between the level of the output voltage and the signal from the sawtooth generator there is generated a modulating pulse for intensity modulation of the ray of the indicator. To make it possible to read the amplitude of the transmission characteristic, a number of reference comparators are arranged to compare a number of fixed reference voltage levels, each corresponding to one of the comparators, with the signal from the sawtooth generator and, upon coincidence, to supply modulating signals to the indicator in order to indicate a corresponding number of horizontal lines.

To make it possible to read the frequency of a certain amplitude value of the transmission characteristic, line corresponding to predetermined frequencies and perpendicular to the first-mentioned horizontal lines are reproduced by intensity modulation of the electron beam of the indicator by a number of frequency indicating pulses appearing at those predetermined frequencies.

The reading of the value of the characteristic gives rise to difficulties in known arrangements because the grid obtained on the screen of the cathode-ray indicator is not suited for a rapid and definite reading of the range within which, for example, the attenuation characteristic of a measuring device is to be located.

An object of the invention is to provide a cathode-ray indicator with a measuring range, within which a characteristic is to be located, which is clearly indicated by its border lines formed by sections of level lines and by frequency lines perpendicular to the level lines.

This is achieved by means of the circuit arrangement according to the invention, comprising a binary counter stepped by each of the frequency indicating pulses. The outputs of the stages of the binary counter are connected in selected combinations to a first logic circuit so that on a number of outputs pulses are produced extending from the beginning of each frequency indicating pulse to the end of the next frequency indicating pulse in order to control the function of the reference comparators. There is a second logic circuit which is adapted to supply a modulating signal to the cathode-ray indicator upon simultaneously receiving a modulating pulse from one of the reference comparators and one of the frequency indicating pulses, and which is adapted to interrupt the modulating signal upon receiving a further modulating pulse from one of the reference comparators during the same frequency indicating pulse or upon receiving a pulse from the sawtooth generator at the end of its sweep period. Thus, horizontal lines corresponding to reference voltage levels become visible between two frequency indicating pulses each corresponding to a predetermined frequency, and lines perpendicular to these horizontal lines become visible between two predetermined reference voltage levels.

Figure 2:
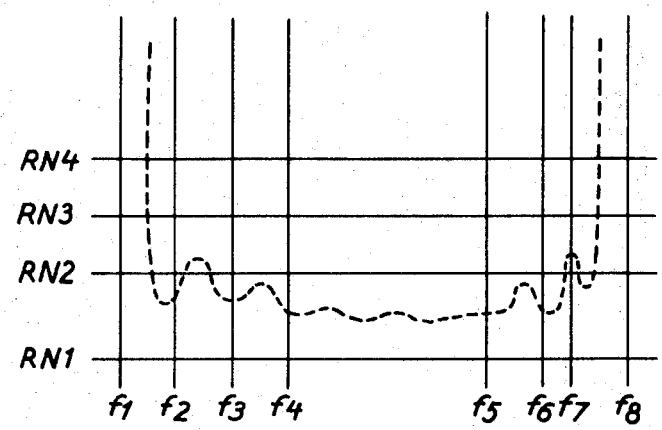
Figure 3:
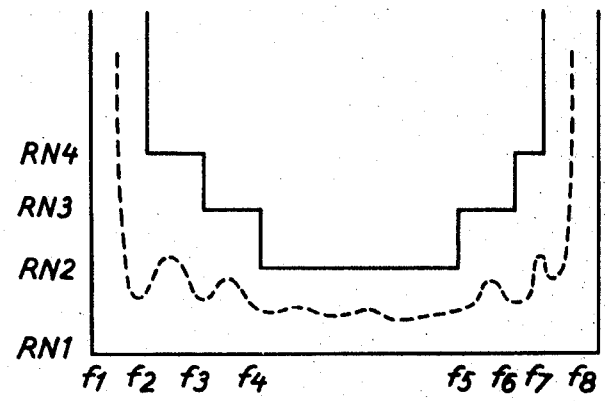
Figure 4:
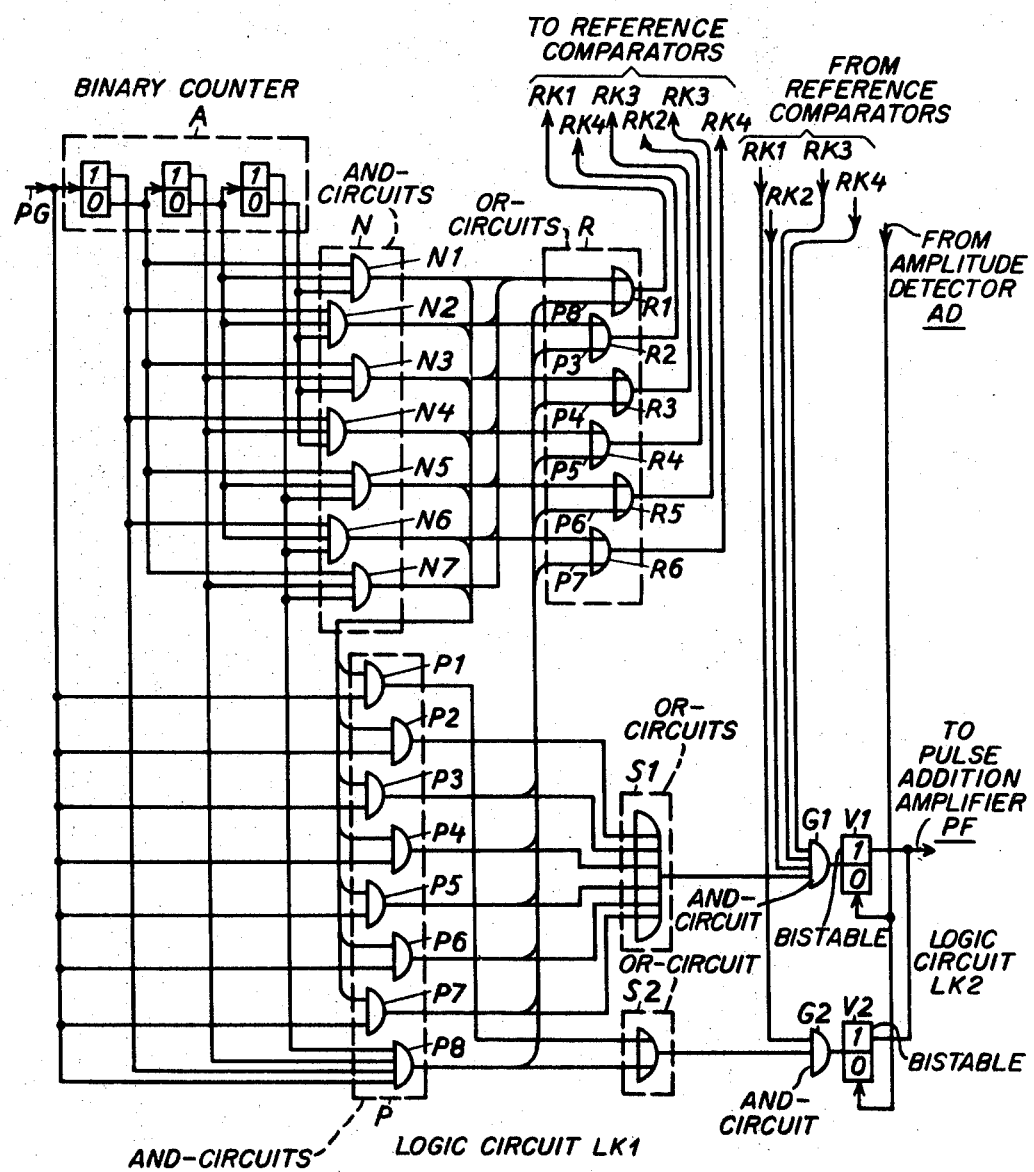

The invention will be further explained by means of an embodiment with reference to the accompanying drawing in which FIG. 1 shows a block diagram of a cathode-ray indicator provided with an arrangement according to the invention, FIG. 2 shows the grid on a screen of a known indicator, FIG. 3 shows the border lines of a selected measuring range on an indicator according to the invention, FIG. 4 shows a diagram of a control circuit of the circuit arrangement according to the invention and FIGS. 5—33 show the waveforms of the different signals supplied to and from the control circuit according to FIG. 4.

In an arrangement according to FIG. 1 a sweep generator G supplies a signal whose frequency is changed continuously between two frequencies, to the measuring device MO, to a level setting circuit NR and to a frequency detector FD.

The output of the frequency detector FD transmits a direct voltage which is proportional to the frequency. The direct voltage deflects the electron beam of a cathode-ray indicator KR horizontally while the signal from a sawtooth generator SG deflects the beam vertically.

A frequency dependent direct voltage signal is obtained on the output of the measuring device through a rectifier not shown here. This signal is supplied to a comparator K which also receives the signal from the sawtooth generator, and, upon coincidence of amplitude between the two signals, produces a modulating pulse that via a pulse addition amplifier PF intensity modulates the beam of the cathode-ray indicator KR.

In the level setting circuit NR a number of constant direct voltage levels are set. These levels are compared with the signal from the sawtooth generator in a number of reference comparators KR1—4, one comparator for each of said voltage levels. The reference comparators produce a modulating pulse each time the voltage of the sawtooth generator coincides with the voltage level belonging to the respective comparator, so that horizontal line RN1—4 are obtained on the screen of the indicator, as indicated in FIG. 2.

FIG. 2 also shows a number of vertical lines, each corresponding to a fixed frequency $f1—f8$. These line are made visible by intensity modulation of the beam or ray of the indicator during a time interval equal to the sweep period of the sawtooth generator or to multiples of the sweep period.

According to the invention only certain predetermined sections of both the horizontal and the vertical lines are reproduced on the screen of the indicator in order to define a certain tolerance range within which the characteristic of a measuring device is to be located as shown in FIG. 3. For this purpose two logic circuits LK1 and LK2 are arranged as will be described more in detail in connection with FIG. 4. These logic circuits produce signals for reproducing only certain parts of the horizontal and the vertical lines on the screen of the indicator.

The output signal of the sweep generator G is also supplied to a pulse generator PG for producing pulses at certain predetermined frequencies, for example the pulses M1—M8 as indicated in FIG. 5. These pulses are hereafter called frequency indicating pulses. The frequency indicating pulses are supplied to the logic circuit LK1 and their width corresponds to the sweep period of the sawtooth generator SG or to multiples of the sweep period.

The sections of the horizontal lines to be reproduced or suppressed between two predetermined frequencies on the screen of the indicator can be determined by these frequency-indicating pulses in such a way that, in correspondence to the selected section which is to be shown, an activating signal is generated, extending from the beginning of a frequency indicating pulse, indicating the beginning of the signal, to the end of a frequency indicating pulse, indicating the end of the signal, as will be explained below.

This is achieved, for example, by first generating a signal, extending from the beginning of one pulse to the beginning of the next pulse and adding the next pulse to the first generated signal.

The logic circuit LK1 (FIG. 4) is fed signals from a binary counter A with three stages, the first stage receiving the pulses supplied by the pulse generator PG and each stage having an 1 output and a 0 output. Upon the stepping of the counter the outputs of each stage will be activated, alternatively, the first frequency indicating pulse bringing the counter to the state where all 0 outputs are activated, and the eighth frequency indicating pulse bringing the counter to the state, where all 1 outputs are activated.

The outputs of the counter are connected in certain combinations to two groups of AND circuits, N1—N7 and P1—P8 respectively of logic circuit LK1, the first-mentioned group, N1—N7, generating signals extending from the beginning of one frequency indicating pulse to the beginning of the next frequency indicating pulse, and the group P1—P8 generating signals equal to the width of the frequency indicating pulse. These signals are supplied to a group of OR circuits R1—R6. The signals on the outputs of the OR circuits R1—R6 are composed of said two signals, as appears from FIGS. 21—26.

Each of the AND circuits P1—P7 has two inputs, one input being connected to the output of the AND circuit N1—N7 with the corresponding serial number, the other input being connected to the input of the binary counter A. The AND circuit P8 has four inputs, one being connected to the input of the counter and each of the three others being separately connected to the 1 outputs of the stages of the counter.

In FIGS. 13—20 the signals obtained on the outputs of the AND circuits P1—P8 are shown. Each of these signals lasts during one frequency indicating pulse. Due to the fact that the output signals of the AND circuits P1—P8 are dependent on both the frequency indicating pulses and on the output signals of the counter, precautionary measures are taken so that the signals according to FIGS. 13—20 appear only when the output signals of the counter have changed.

The purpose of the OR circuits R1—R6 is to produce the signals extending from the beginning of a selected frequency indicating pulse to the end of another selected frequency indicating pulse. For this purpose the inputs of the OR circuits R2—R6 consist of an output from an AND circuit in the N group and of an output from an AND circuit in the P group so that for example the OR circuit R2 obtains output signals from the AND circuit N2 and the AND circuit P3, the OR circuit R3 obtains output signals from the AND circuit N3 and the AND circuit P4, etc. In this way the waveforms shown in FIGS. 22—26 will be obtained on the respective outputs. Since it is desirable, according to the example, that no section of the line RN1 should be suppressed, the signal necessary for reproducing this line extends from the beginning of the first frequency indicating pulse to the end of the last frequency indicating pulse, as appears from FIG. 21. This is achieved by means of the OR circuit R1 obtaining all the output signals from the AND circuits N1—N7 and furthermore the output signal from the AND circuit P8 corresponding to the last frequency indicating pulse.

The output signals from the OR circuits R1—R6 are used to control the function of the reference comparators in such a way that the comparators can only supply modulating pulses to the cathode-ray indicator during the time they obtain one of said output signals.

As appears from FIG. 3 a different number of sections of the levels are shown on the indicator. Only one section of the levels RN1 and RN2 is shown while two sections are shown of the levels RN3 and RN4. In correspondence to this, the reference comparators belonging to the levels RN3, RN4 must be controlled during two different frequency intervals. Of the six outputs of the OR circuits R1—R6, the output of the OR circuit R1 is consequently connected to the reference comparator RK1, producing according to the example a continuous line on the indicator from the frequency $f_1$ to the frequency $f_8$ (FIG. 21), the output of the OR circuit R4 is connected to the reference comparator RK2 in order to produce the section in FIG. 3 belonging to the level RN2 (FIG. 24), the outputs from the OR circuits R3 and R5 are connected to the reference comparator RK3 in order to produce the two sections belonging to the level RN3 (FIGS. 23 and 25) and the outputs from the OR circuits R2 and R6 are connected to the reference comparator RK4 in order to produce the two sections belonging to the level RN4 (FIGS. 22 and 26).

The horizontal lines of the indicator, continuous to the eye, consist of course of a number of dots produced during each sweep period of the sawtooth generator when coincidence occurs between the fixed levels of the reference comparators and the voltage of the sawtooth generator.

As mentioned earlier the vertical lines corresponding to certain frequencies are obtained by intensity modulation of the beam of the indicator during a time interval equal to the sweep period of the sawtooth generator or to multiples of the sweep period.

If only certain parts of the vertical lines are to be shown, the other parts will be suppressed by means of the logic circuit LK2.

The horizontal lines are produced by means of a very short modulation of the ray of the indicator during each sweep period of the sawtooth generator. The vertical lines will be produced by modulation of the ray of the indicator during a complete sweep period of the sawtooth generator or part of it. Since the vertical lines are to be produced at frequencies determined by the frequency indicating pulses, said modulation of the ray of the indicator must be carried out during the sweep period of the sawtooth generator, occurring during a frequency indicating pulse. (As mentioned earlier the duration of a frequency indicating pulse is equal to the sweep period of the sawtooth generator or to multiples of the sweep period.) This is arranged so that the ray of the indicator is modulated with a pulse from the logic circuit, said pulse being longer than the very short modulating pulses obtained from the comparators. Since furthermore, a vertical line is to begin at the first dot of a horizontal line produced by a modulating pulse from the corresponding reference comparator, two conditions must be fulfilled for a vertical line to be reproduced. A frequency indicating pulse must be existing and furthermore a modulating pulse from one of the reference comparators must appear.

This longer modulating pulse can be produced by means of a bistable circuit brought from one of its conditions to its other condition by a pulse indicating one of the ends of a section of a vertical line and brought back to its first condition by a second pulse indicating the other end of said section. This will be explained more in detail in connection with FIG. 4 and FIGS. 27- —33.

Due to the fact that according to the example there are vertical lines that are not suppressed as well as vertical lines where certain sections are suppressed, there is a difference in the control arrangements for these lines.

A binary bistable circuit V2, FIG. 4, normally in its 0 condition is changed to its 1 condition upon obtaining a pulse from an AND circuit G2. The output signal of the AND circuit is dependent on two conditions, first the fact that the frequency indicating pulse corresponding to the selected frequency is present on one of the inputs, and, secondly, that a modulating pulse is supplied to the other input from the reference comparator corresponding to the level where the vertical line is to begin. As appears from FIG. 3 the vertical lines belonging to the frequencies $f_1$ and $f_8$ are continuous and the bistable circuit V2 is used to reproduce these two lines.

The frequency indicating pulse corresponding to the frequency $f_1$ is supplied to the AND circuit G2 via the AND circuit P1 and an OR circuit S2. As soon as the voltage of the sawtooth generator reaches the value RN1, a modulating pulse will be supplied from the output of the reference comparator RK1 to the other input of the AND circuit G2, so that a pulse is supplied to the bistable circuit V2, bringing it to its 1 condition. From the 1 output of the bistable circuit V2 a modulating signal is now supplied through the pulse addition amplifier PF (FIG. 2) to the indicator KR, so that the ray is modulated all the time the bistable circuit V2 is in its 1 position. When the voltage of the sawtooth generator SG reaches its maximum value, a zero setting pulse will be supplied to the bistable circuit V2 from an amplitude detector AD, the input of this detector being connected to the output of the sawtooth generator SG. The process for reproducing the line corresponding to the frequency $f_8$ is the same but the frequency indicating pulse in this case is obtained from the AND circuit P8.

To reproduce the vertical lines where certain sections are suppressed, there is a binary bistable circuit V1, which can be changed from its 0 position to its 1 position by means of an output pulse from an AND circuit G1 and which can be changed back by the next pulse from said AND circuit. One of the input conditions for the AND circuit G1 is the presence of a frequency indicating pulse corresponding to the frequency of the vertical line to be reproduced. This pulse is obtained from an OR circuit S1 via one of the AND circuits P2—P7. The other input condition is the presence of the short modulating pulse obtained from one of the reference comparators when its voltage level coincides with the voltage of the sawtooth generator. Concerning the vertical lines where the visible section extends to the upper edge of the screen of the indicator, for example the lines corresponding to the frequencies $f2$ or $f7$, the 1 output of the bistable circuit V1 supplies a modulating signal to the ray of the indicator, until it is reset to its 0 position by a pulse from the amplitude detector AD when the voltage of the sawtooth generator has reached its maximum value.

Concerning lines where only an intermediate section is shown, for example the lines corresponding to the frequencies $f3, f4, f5$ or $f6$, the circuit V1 will be set to its 1 position by the modulating pulse obtained from the level belonging to the lower end of the vertical line, for example from the reference comparator RK3 for the frequency line $f3$ and will be reset to its 0 position by the modulating pulse received from the level belonging to the upper limit of the line, in this case from the reference comparator RK4 for line $f$.

FIG. 31 and FIG. 27 show the pulses SU2—SU7 and SU1, SU8 respectively obtained from the OR circuits S1 and S2 respectively, these signals corresponding to the frequency indicating pulses M2—M7 and M1, M8 respectively. FIG. 28 shows the modulating pulse from the reference comparator RK1, occurring according to the example next to the beginning of the pulse SU1, causing the bistable circuit V2 to take its 1 condition, shown in FIG. 29 and remaining there until it is reset to its 0 position by the 0 setting pulse from the amplitude detector AD indicated in FIG. 30. FIG. 32 shows the modulating pulses for the frequency line $f4$, the first one being the modulating pulse from the reference comparator RK2. This first pulse sets the bistable circuit V1 into 1 position, according to FIG. 33, the second pulse being the modulating pulse from the reference comparator RK3, resetting the bistable circuit V1 to its 0 position, so that the remaining part of the frequency line $f4$ is suppressed.

As appears from FIG. 1, the level setting circuit NR is supplied with the output signal from the sweep generator G. Hence, the direct voltage levels are always dependent on the same voltage as is supplied to the measuring device MO. Variations of voltage will consequently have no effect upon the relation between the transmission characteristic and the reproduced voltage levels.

The invention is of course not limited to the embodiment described and the tolerance range may have an arbitrary form provided that it consists of horizontal and vertical lines. It is only necessary to select the frequency indicating pulses and the voltage levels in a desired manner and to adjust the binary counter and the logic circuits to the tolerance range selected.

I claim:

1. A circuit arrangement for producing a tolerance range display on a cathode-ray indicator having horizontal and vertical sweep and beam intensity modulation circuits which displays the transmission characteristic of a frequency dependent measuring device comprising a sweep generator, said sweep generator transmitting a sweep voltage to said measuring device, a sawtooth generator, a comparator connected to said measuring device and said sawtooth generator for generating a transmission-characteristic intensity modulating pulse for each level coincidence of the signal from said measuring device and the sawtooth signal from said sawtooth generator, a source of a plurality of different reference voltages, a plurality of controllable reference comparators, each of said reference comparators being connected to said sawtooth generator and said source of reference voltages, each of said reference comparators generating a horizontal-line intensity modulating pulse for each level coincidence between the sawtooth signal and a different one of said reference voltages, pulse generator means responsive to said sweep generator for generating frequency indicating pulses occurring at different predetermined frequencies, a binary counter connected to said pulse generator means and being stepped by the frequency indicating pulses, a first logic circuit connected to said binary counter for generating different control pulses dependent on the count in said binary counter, each of said control pulses starting at the beginning of one frequency indicating pulse and ending at the end of the next frequency indicating pulse, means for transmitting said control pulses to different ones of said reference comparators for controlling the times of operation thereof, a second logic circuit connected to said reference comparators, said sawtooth generator and said pulse generator means for generating vertical-line modulating pulses, said second logic circuit including means for initiating a vertical-line modulating pulse upon the coincidence of a selected one of the frequency indicating pulses and selected ones of the horizontal-line intensity modulating pulses and means for terminating such pulses upon receipt of a second horizontal-line intensity modulating pulse while the same frequency indicating pulse is present or upon the occurrence of a particular portion of the sawtooth signal from said sawtooth generator, and means for connecting said sawtooth generator to the vertical deflection circuits and said sweep generator to said horizontal deflection circuits whereby the beam of the cathode-ray indicator sweeps out a raster, and means for transmitting the horizontal-line intensity modulating pulses, the vertical-line intensity modulating pulses and the transmission-characteristic intensity modulating pulses to said intensity-modulating circuit of said cathode-ray indicator so that selected portions of the horizontal lines corresponding to reference voltage levels and selected portions of vertical lines corresponding to the particular frequencies are displayed with the transmission characteristic.

2. The circuit arrangement of claim 1 wherein said first logic circuit comprises a plurality of first AND circuit having inputs, connected to selected combinations of outputs of said binary counter, and outputs, a plurality of second AND circuits, each having two inputs and an output, one input of each of said second AND circuits being connected to said pulse generator means for receiving the frequency indicating pulses, the other input of each of said second AND circuits being connected to the output of a different one of said first AND gates, and a plurality of OR circuits having inputs connected to the outputs of different ones of said first and second AND circuits and having outputs for transmitting the control pulses.

3. The circuit arrangement of claim 1 wherein said second logic circuit comprises at least one bistable circuit having an input for causing a change in state of said bistable circuit whenever a pulse is received at said input, and an output, and at least one AND circuit having inputs connected to outputs of said first logic circuit and said reference comparators and an output connected to the input of said bistable circuit for transmitting pulses to said input upon coincidences of particular frequency indicating pulses and particular horizontal-line intensity modulating pulses, the output of said bistable circuit transmitting the vertical-line intensity modulating pulses.

4. The circuit arrangement of claim 1 wherein the reference voltages are directly related to the output voltage of said sweep generator.